March 27, 1928.

H. HANSEN

TRIPLE VALVE

Filed Jan. 18, 1927

FROM BRAKE PIPE

INVENTOR
HENRY HANSEN
BY Munn & Co
ATTORNEY

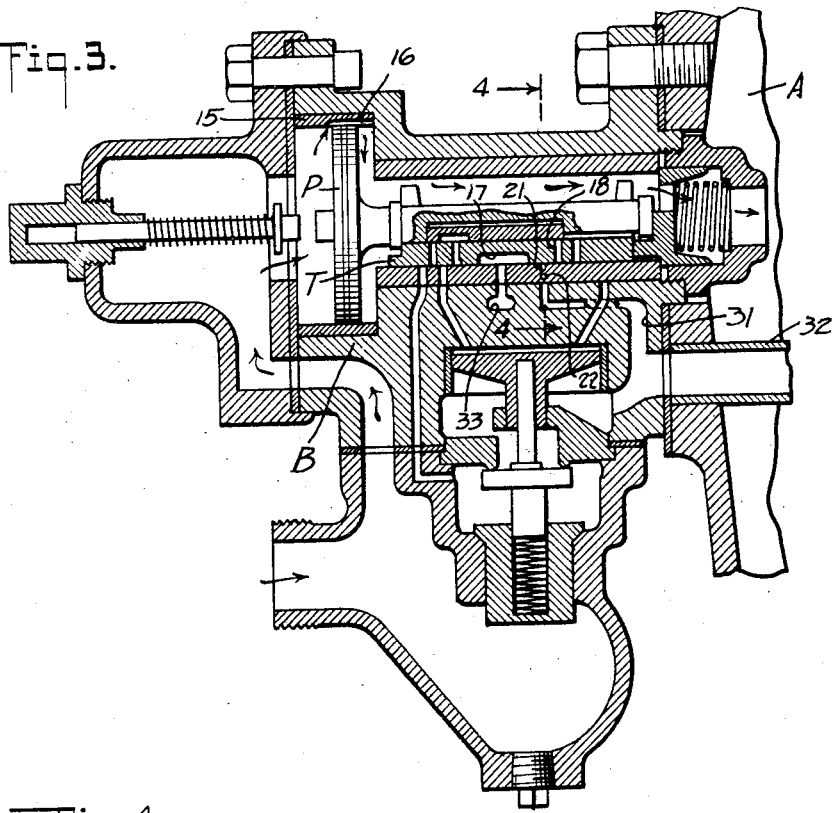
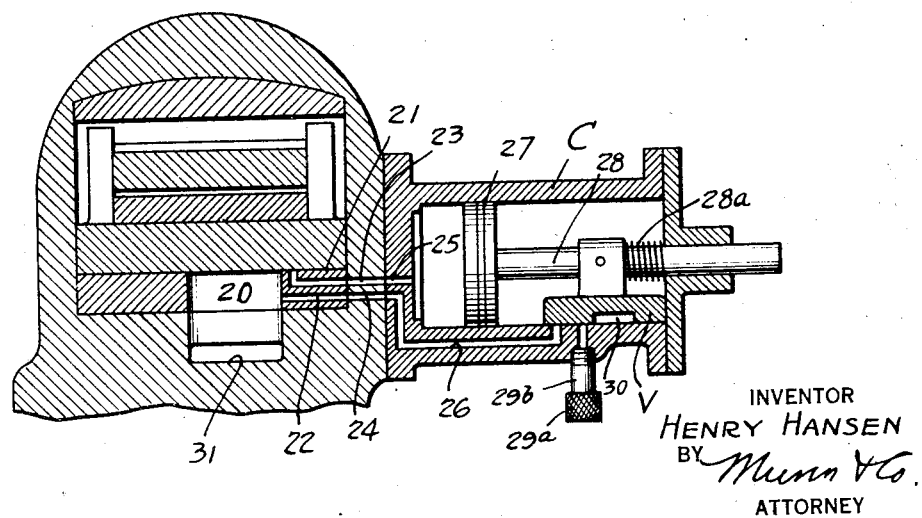

March 27, 1928.  H. HANSEN  1,663,837
TRIPLE VALVE
Filed Jan. 18, 1927   3 Sheets-Sheet 3
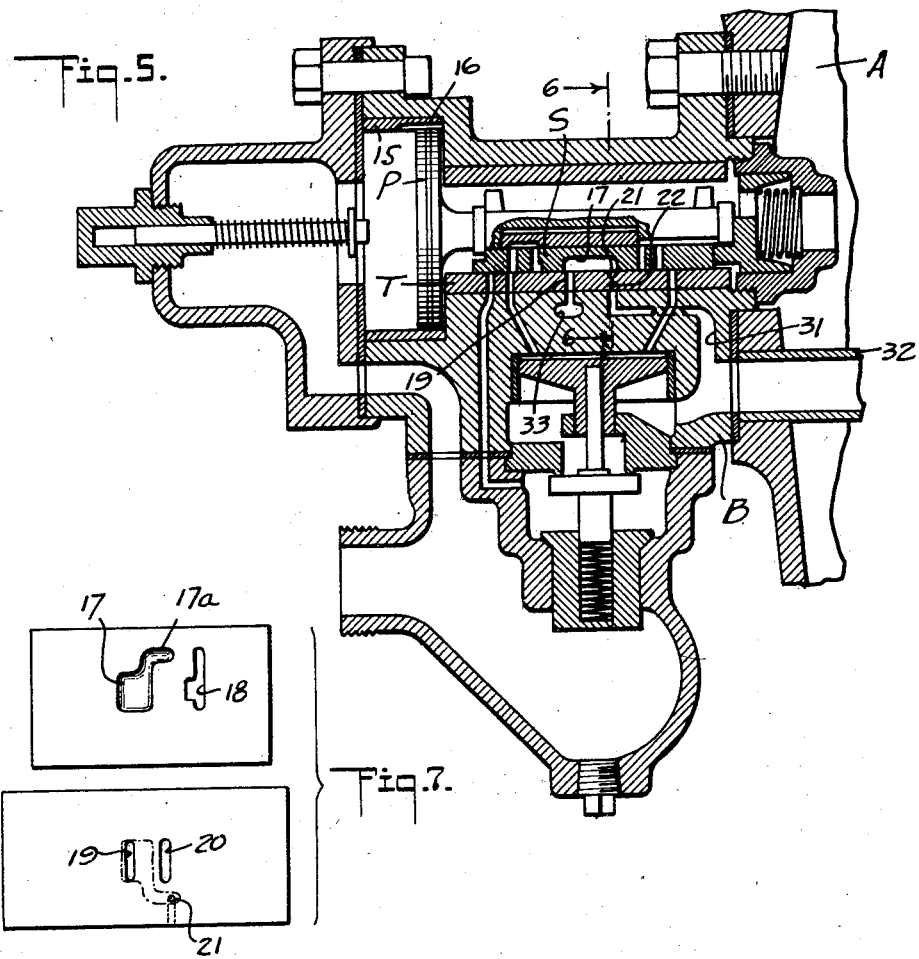
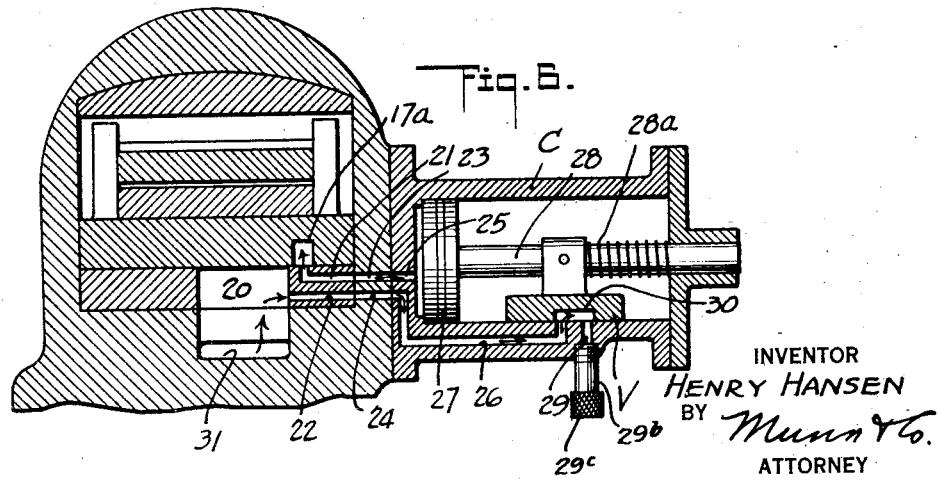
INVENTOR
HENRY HANSEN
BY Munn & Co.
ATTORNEY Patented Mar. 27, 1928.

1,663,837

UNITED STATES PATENT OFFICE.

HENRY HANSEN, OF BISBEE, ARIZONA.

TRIPLE VALVE.

Application filed January 18, 1927. Serial No. 161,895.

My invention relates to triple valves for air brake systems and it has particular reference to the type K triple valve.

In valves of this character, as previously constructed, recharging of the auxiliary reservoir following a brake application can be effected only by bleeding the brake cylinder to atmosphere, resulting in a complete brake release. Where a prolonged brake application is required without cessation, the present triple valve is a failure, by reason of the fact that before the auxiliary reservoir can be recharged to maintain the brakes applied a brake release must occur, thus destroying the continuity of the brake application.

It is a purpose of my invention to provide a triple valve by which the auxiliary reservoir is recharged without producing a brake release, so that a prolonged brake application can be effected when required. My invention is primarily designed to eliminate the attendant danger of intermittent brake applications when continued brake application is demanded to safely control the movement of a train or car descending relatively long grades, such intermittent applications producing intervening periods in which the train or car is without brake application and the several periods totalizing with the result that the train or car finally becomes beyond the control of the braking system.

It is also a purpose of my invention to provide a triple valve of the above described character which adheres closely to the structure of the present triple valve to the extent that it may be construed as an attachment therefor, and hence the present valve is not rendered obsolete as a whole.

I will describe only one form of triple valve embodying my invention and will then point out the novel features thereof in claims.

In the accompanying drawings,

Figure 3 is a view similar to Figure 1 showing the valve in full release and charging position;

Figure 4 is a sectional view taken on the line 4—4 of Figure 3;

Figure 5 is a view similar to Figure 3 showing the valve in retarded release position;

Figure 6 is a sectional view taken on the line 6—6 of Figure 5;

Figure 7 is a view showing confronting sides of the slide valve and seat embodied in the triple valve shown in the preceding views.

Figure 1:
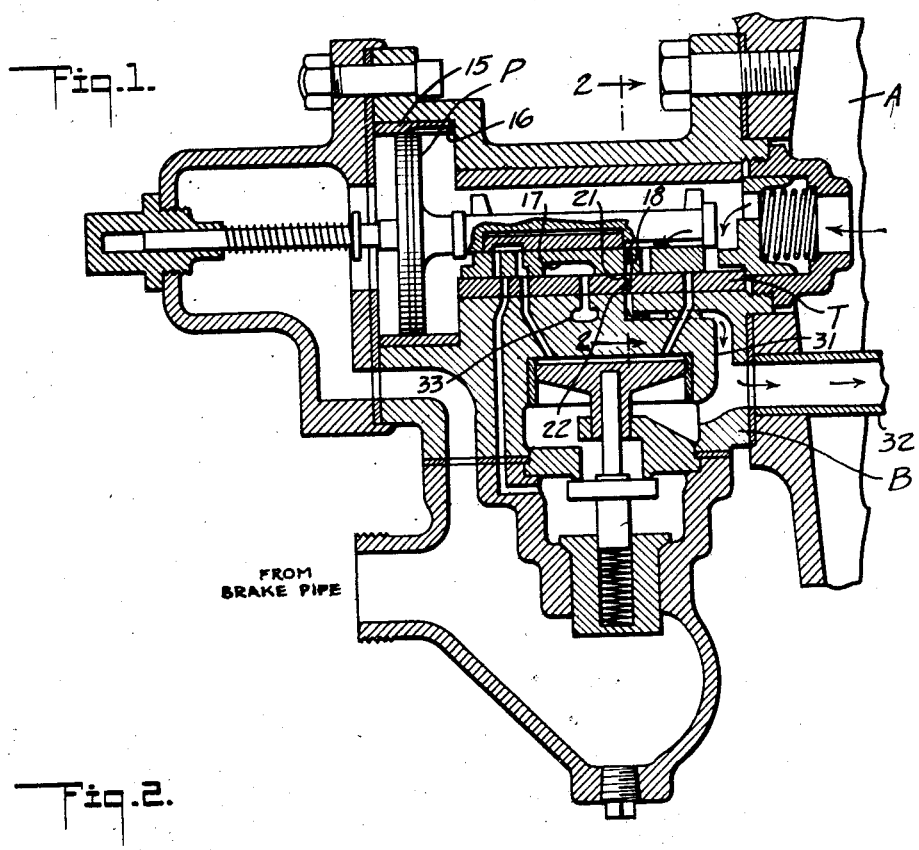
Figure 1 is a view showing in vertical section one form of triple valve embodying my invention in applied position to an auxiliary reservoir and brake pipe with the valve in a service application position.

As previously stated, my invention adheres closely to the structure of the present triple valve and although I have shown a complete triple valve I will describe in detail only those parts necessary to a clear understanding of the construction and operation of my triple valve. As shown in Figure 1, P designates a piston movable in a cylinder having a liner 15 grooved to provide a port 16, the piston being movable by fluid pressure to cover and uncover the port 16, and thus co-operating with the latter to form what I term a main valve. This main valve is operable to control the admission of air in the recharging of an auxiliary reservoir A, air being supplied thereto from a brake pipe to which the triple valve is connected as indicated by the legend in Figure 1. As in the conventional triple valve, the piston P is movable to operate a slide valve S on a seat T, and the seat is secured on what I term a body B of the triple valve.

Figure 2:
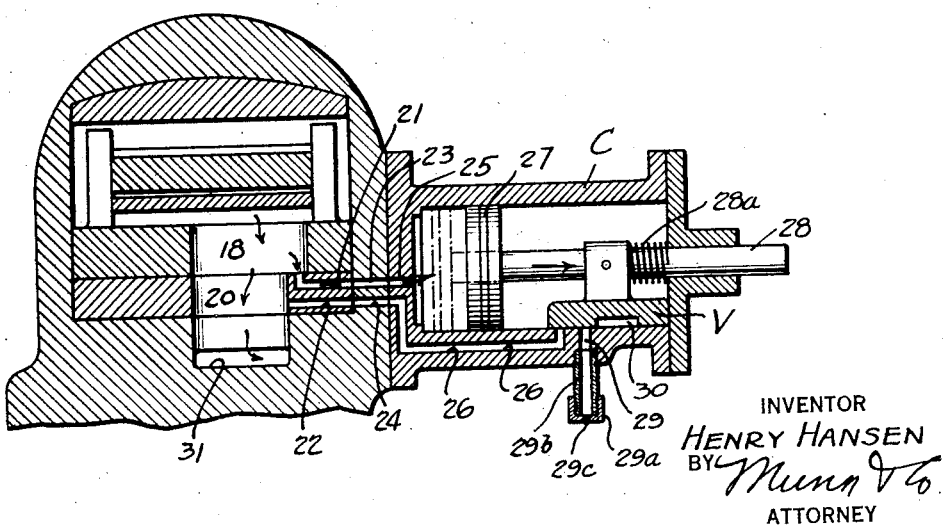
Figure 2 is a vertical sectional view taken on the line 2—2 of Figure 1.

As clearly shown in Figure 7, the slide valve S is provided with a cavity 17 and a port 18. The valve is provided with other ports to conform to the conventional slide valve but as they do not enter into the novel features of my triple valve they will not be described and have not been shown in Figure 7. The cavity 17 corresponds to the usual cavity of the slide valve but it is of different contour, as clearly illustrated in Figure 7, and is formed with an extension 17$^a$, the purpose of which will be described hereinafter. The valve seat T is provided with the usual ports, and those with which we are concerned have been illustrated in Figure 7 and designated 19 and 20. However, in addition I provide the valve seat with ports 21 and 22, which, as clearly shown in Figure 2, are disposed at one side of the ports 19 and 20. The port 21 is adapted to communicate with the cavity 17 and its extension 17$^a$, but the port 22 at no time is in communication with the cavity but is at all times in communication with the port 20. The ports 21 and 22 are continuations of ports 23 and 24, respectively, formed in the body of the triple valve, as clearly shown in Figure 2, and secured to the side of the body is a cylinder C, the inner end of which is provided with a port 25 constituting a continuation of the port 23, and a passage 26 which constitutes a continuation of the port 24. The port 25 is for the purpose of admitting air under pressure to the cylinder C to actuate a piston 27 having a rod 28 to which is fixed a supplemental or exhaust valve V. An exhaust port 29 is formed in the cylinder C by which air under pressure may be exhausted to atmosphere, and the rapidity of such exhaust can be controlled by a cap 29$^a$ threaded on a pipe 29$^b$, the latter being threaded in the port as shown in Figure 2. The cap 29$^a$ is any one of a plurality of such caps which can be formed with different size openings 29$^c$. The larger the opening the more rapid the exhaust of air to atmosphere, hence the rate of exhaust can be regulated as desired by the application of a cap having the proper size opening. This port is adapted to be placed in communication with the passage 26 through a cavity 30 formed in the valve V, but only when the valve occupies the position shown in Figure 6, as will be described hereinafter. A spring 28$^a$ is associated with the rod 28 to normally urge the piston 27 and the valve V to the position shown in Figure 6.

The body B is provided with a passage 31 which at one end is in communication with the port 20 of the valve seat T, its opposite end being in communication with a pipe 32 which leads to the brake cylinder (not shown). When the port 18 of the slide valve S is in registration with the port 20, fluid pressure from the auxiliary reservoir A can be supplied to the brake cylinder through the passage 31 and the pipe 32. The body B is also provided with the usual exhaust port 33 which in previous triple valves functioned to exhaust the brake cylinder to atmosphere, but which in the present instance functions to exhaust the cylinder C to atmosphere.

The operation of the triple valve is as follows: The valve is illustrated in Figure 1 as in a service application position in which fluid pressure from the auxiliary reservoir A is supplied to the brake cylinder to effect a brake application through the port 18 of the valve S, port 20 of the seat T, and passage 31 to the pipe 32. Slightly in advance of the admission of fluid pressure to the brake cylinder, the port 18 functions to supply air to the cylinder C through the ports 21, 23 and 25. With admission of fluid pressure to the cylinder C, the piston 27 is moved from its normal position and against the action of the spring 28$^a$ to the solid line position shown in Figure 2. Under this movement the valve V is shifted so that its cavity 30 is out of registration with the passage 26 and the exhaust port 29. Manifestly the valve V in its new position functions to prevent the exhaust of fluid to atmosphere.

Referring now to Figure 3, the piston P has been advanced by the admission of fluid pressure thereto from the main reservoir to uncover the port 16, thus admitting fluid pressure to the auxiliary reservoir A to effect recharging of the latter. Under this movement of the piston P the slide valve S is advanced to the position shown in which the port 18 is moved out of registration with the port 20 whereby further admission of fluid pressure to the brake cylinder is discontinued. This position of the slide valve and piston is referred to in the art as the full release and charging position, but in my type of triple valve no release of the brakes is effected because of the fact that air cannot be exhausted from the brake cylinder. By reference to Figure 4 it will be seen that in the advanced position of the slide valve S the port 21 is closed, thus trapping fluid pressure within the cylinder C to maintain the piston 27 in the advanced position and the valve V in closed position in respect to the exhaust port 29. Thus recharging of the auxiliary reservoir takes place while a brake application is maintained. It is this operation of my triple valve which distinguishes it from present valves, as hereinbefore explained.

Referring now to Figure 5, the triple valve is shown in a retarded release position in which the piston P is advanced to its furthest position and likewise the slide valve S. In this new position of the valve the extension 17$^a$ of the cavity 17 registers with the port 21 as illustrated in Figure 6, while the main portion of the cavity remains in registration with the port 19 of the seat T, as indicated in dotted lines in Figure 7. Resultant of this new position, the slide valve functions to permit fluid pressure to be exhausted from the cylinder C, thereby allowing the piston 27 to return to normal position under the action of the spring 28$^a$, and as a consequence moving the valve V so that its cavity 30 registers with the passage 26 and the exhaust port 29, thereby placing the passage 26 in communication with atmosphere. The fluid pressure in the brake cylinder can now be exhausted to atmosphere through the passage 31, ports 20, 22 and 24 to the passage 26. Thus in the retarded release position a release of the brakes is effected.

Although I have herein shown and described only one form of triple valve embodying my invention, it is to be understood that various changes and modifications may be made therein without departing from the spirit of the invention and the spirit and scope of the appended claims.

I claim as my invention:

1. A triple valve having a main valve adapted to control recharging of an auxiliary reservoir, a subsidiary valve adapted to control charging of a brake cylinder, a supplemental valve adapted to control the exhaust of the brake cylinder, and means operable upon movement of the main valve to a position in which the auxiliary reservoir is being recharged for moving the supplemental valve to non-exhausting position whereby a brake application is maintained while recharging the auxiliary reservoir.

2. A triple valve having means adapted to admit fluid pressure to a brake cylinder when the valve is in service application position, means adapted for admitting fluid pressure to an auxiliary reservoir for recharging the latter when the valve is in full release and charging position, and means adapted for trapping fluid pressure in the brake cylinder when the valve is in full release and charging position and maintaining the fluid pressure trapped in the cylinder so long as the valve occupies full release position.

3. A triple valve having means adapted to admit fluid pressure to a brake cylinder when the valve is in service application position, means adapted for admitting fluid pressure to an auxiliary reservoir for recharging the latter when the valve is in full release and charging position and means adapted for trapping fluid pressure in the brake cylinder when the valve is in full release and charging position and for exhausting it from the brake cylinder only when the valve is in retarded release position.

4. In a triple valve, a slide valve having therein a port and a cavity, a seat on which the valve is slidable having two pairs of ports, a body having an exhaust port, a passage, and a pair of ports communicating respectively with the ports of one pair of the seat ports, a cylinder, a piston in the cylinder, a valve movable with the piston, an admission port in the cylinder communicating with one port of one of the pairs of body ports, a passage in the cylinder communicating with the other of the pair of body ports, an exhaust port in the cylinder adapted to be placed in communication with the passage of the cylinder when the valve therein is in open position, and means for yieldably urging the piston to a position in which the valve is open.

HENRY HANSEN.